United States Patent
Profanchik et al.

(10) Patent No.: US 7,256,816 B2
(45) Date of Patent: Aug. 14, 2007

(54) SYSTEMS AND PROCESSES FOR SCHEDULING AND CONDUCTING AUDIO/VIDEO COMMUNICATIONS

(75) Inventors: John D. Profanchik, Plano, TX (US); Alan L. Whitebread, Lubbock, TX (US); Sandra L. Boyd, New Braunfels, TX (US)

(73) Assignee: 3V Technologies Incorporated, Plano, TX (US)

( * ) Notice: Subject to any disclaimer, the term of this patent is extended or adjusted under 35 U.S.C. 154(b) by 0 days.

(21) Appl. No.: 10/973,025

(22) Filed: Oct. 25, 2004

(65) Prior Publication Data

US 2006/0087554 A1    Apr. 27, 2006

(51) Int. Cl.
H04N 7/14    (2006.01)
(52) U.S. Cl. .................. 348/14.09; 348/14.08; 709/204; 370/261
(58) Field of Classification Search .... 348/14.01–14.1; 379/114.03, 114.16, 114.2, 202.01, 210.01; 709/204; 370/260–263; 715/753
See application file for complete search history.

(56) References Cited

U.S. PATENT DOCUMENTS

| | | |
|---|---|---|
| 4,691,347 A | 9/1987 | Stanley et al. |
| 4,710,917 A | 12/1987 | Tompkins et al. |
| 4,783,800 A | 11/1988 | Levine |
| 4,847,829 A | 7/1989 | Tompkins et al. |
| 4,882,743 A | 11/1989 | Mahmoud |
| 5,003,532 A | 3/1991 | Ashida et al. |
| 5,014,267 A | 5/1991 | Tompkins et al. |
| 5,382,972 A | 1/1995 | Kannes |
| 5,483,587 A | 1/1996 | Hogan et al. |
| 5,589,873 A | 12/1996 | Natori et al. |
| 5,710,591 A | 1/1998 | Bruno et al. |

(Continued)

FOREIGN PATENT DOCUMENTS

JP    10-285531    * 10/1998

(Continued)

OTHER PUBLICATIONS

PCT International Search Report and Written Opinion of the International Searching Authority—PCT/US04/36070, no date provided.

(Continued)

*Primary Examiner*—Melur Ramakrishnaiah
(74) *Attorney, Agent, or Firm*—Baker & McKenzie LLP (57) ABSTRACT

Disclosed herein are methods of scheduling and conducting video visits, as well as computer architecture for providing such scheduling and conducting, where the participants in the visit are not required or able to interact with the audio/video equipment for the initial connection to start the video visit. In some embodiments, participants are also not able to interact with the equipment during the actual visit, and thus the equipment employed during the video visit may be isolated from physical contact by the participants. To initiate or terminate a video visit, a data center establishes a data connection with each participant, and thus the flow of data between the participants moves across a computer network and via the data center. The visit may be monitored in virtually real-time by splitting the data transmitted between the participants and sending it to a monitoring terminal, rather than establishing a separate connection for the monitoring.

55 Claims, 6 Drawing Sheets

U.S. PATENT DOCUMENTS

| | | | |
|---|---|---|---|
| 5,719,928 A | 2/1998 | Pinnell et al. | |
| 5,745,160 A | 4/1998 | Ishida et al. | |
| 5,821,984 A | 10/1998 | Ito et al. | |
| 5,844,600 A * | 12/1998 | Kerr | 348/14.12 |
| 5,848,132 A | 12/1998 | Morley et al. | |
| 5,867,653 A | 2/1999 | Aras et al. | |
| 5,872,841 A | 2/1999 | King et al. | |
| 5,903,302 A | 5/1999 | Browning et al. | |
| 5,978,463 A | 11/1999 | Jurkevics et al. | |
| 5,982,863 A | 11/1999 | Smiley et al. | |
| 6,088,429 A | 7/2000 | Garcia | |
| 6,104,788 A | 8/2000 | Shaffer et al. | |
| 6,211,902 B1 * | 4/2001 | Tanoi | 348/14.09 |
| 6,292,211 B1 * | 9/2001 | Pena | 348/14.08 |
| 6,343,313 B1 | 1/2002 | Salesky et al. | |
| 6,356,294 B1 | 3/2002 | Martin et al. | |
| 6,466,252 B1 | 10/2002 | Miyazaki | |
| 6,674,459 B2 * | 1/2004 | Ben-Shachar et al. | 348/14.09 |
| 2001/0047264 A1 | 11/2001 | Roundtree | |
| 2002/0066109 A1 | 5/2002 | Tam et al. | |
| 2003/0069752 A1 | 4/2003 | LeDain et al. | |
| 2003/0091169 A1 * | 5/2003 | Cain | 379/114.2 |
| 2003/0174826 A1 * | 9/2003 | Hesse | 379/210.01 |
| 2004/0111752 A1 | 6/2004 | Katz et al. | |
| 2005/0027581 A1 | 2/2005 | Kjesbu et al. | |

FOREIGN PATENT DOCUMENTS

| | | |
|---|---|---|
| WO | WO01/79626 A1 | 10/2001 |
| WO | WO03/053005 A1 | 6/2003 |

OTHER PUBLICATIONS

Videoconference Rooms for Rent by the Hour http:www.mivnet.com/users.php and www.mivnet.com/users/prim_services.php, no date available.

Technology Guide, H. 323 Technology, Copyright 1998-2004, Ixia, no date available.

L. Lambrinos, P. Kirstein and V. hardman, "Distributed Recording of Mbone Sessions", no date available.

R. Cohen and G. Kaempfer, "A Unicast-based Approach for Streaming Multicast", Department of Computer Science, Technion, Haifa 32000, Israel, no date available.

Networked Multimedia Communication, Telejustice and Security Solutions, www/vugate.com/index.html printed Feb. 10, 2005, no date available.

* cited by examiner

SYSTEMS AND PROCESSES FOR SCHEDULING AND CONDUCTING AUDIO/VIDEO COMMUNICATIONS

TECHNICAL FIELD

Disclosed embodiments herein relate generally to audio and video communications, and more particularly to scheduling and conducting monitored or unmonitored video visits, as well as the computer architecture for providing such scheduling and conducting of video visits between any number of endpoints.

BACKGROUND

When two parties want to communicate in real-time over great distances, the telephone has been the traditional communications device of choice. Advancements in technologies over the years have now permitted both audio and video communications between parties over great distances. This form of communications is commonly referred to as video conferencing, and depending on the complexity (and associated expense) of the equipment involved may provide nearly real-time communications among two or more parties.

In traditional form, video conferencing includes some type of local equipment associated with each person seeking to participate in the conference. When the conference is to be started, the equipment at each location is employed to call in (e.g., "conference in") to a call center. As each of these endpoints establishes a connection with the central location, the video and audio signals may then be accessed by all of the participants so that a conversation with both audio and video can take place. Among the various types of video conferencing equipment, one of the most common employs specialty dedicated equipment at each geographic location of the participants. This equipment typically employs an ISDN or similar data connection to transmit and receive audio/video communications data during the video conference.

Unfortunately, conventionally available video conferencing equipment has a common characteristic: each system requires endpoint initiation (and termination) for each participant in the conference. Such a requirement has several disadvantages, including the high cost associated with such specialty equipment, and the freedom (or burden) to control the equipment at each corresponding endpoint. Regarding expense, many companies or individuals are financially prohibited from enjoying such video conferencing because they either cannot afford the special equipment, or perhaps cannot justify the expense for equipment not regularly used. Regarding endpoint control, the difficulty in operating such specialty equipment is a burden many people would like to be without. In addition, situations exist where initiation of the video conference and control of the video conferencing equipment by one or more of the participants is not desired.

An example of a situation where endpoint control is not desirable is in the prison system. Many times, a prison inmate is housed in a location a great distance from his family or friends, which results in visitation of the inmate being inconvenient or even impossible due to travel time and expense. As such, a video conference with the inmate would seem a perfect answer; however, as mentioned above, the expense and complexity of the necessary equipment may be prohibitive. Perhaps more important is the potential security risk if endpoint control is permitted in a video conference with an inmate. Even in conventional face-to-face visits, conversations between inmates and their visitors are monitored to ensure that no greater security risk is created than already exists with an outsider's presence in the prison. However, if endpoint control in such a visitation scenario were permitted, it would be difficult to effectively monitor the visit to ensure security. Potential security breaches include, but are not limited to, coded dialog between the inmate and a visitor, as well as hand and facial gestures used to communicate improper information.

While traditional video conferencing equipment could potentially be used in the prison scenario, the above-mentioned problems would still be present. More specifically, conventional video conferencing requires endpoint control to initiate and terminate the conversation. As a result, an overseer may not be capable of ending the visit if conduct violations occur during the visit. In addition, with endpoint control of the equipment, a prison inmate can easily damage the equipment if he has access to it, and may lack the technical knowledge to even operate the equipment at all. Although a security officer or technician may be given control of the equipment so that it is not accessible by the inmate, another disadvantage is created by requiring the services of an employee, whose time is probably better served elsewhere.

Perhaps the most important reason why traditional video conferencing would not be workable for prison visitation and other similar situations is the lack of synchronicity between data connections during the conference. More specifically, as each participant in the video conference connects to the conversation, a new data connection, or path, is created. In a prison situation, at least three data paths would be present: one for the inmate, one for the visitor, and one for the overseer monitoring the conversation. Unfortunately, an inherent latency exists between these multiple connections that poses a significant security risk for the prison. Because of latency in the data path during data transmission, communication is not instantaneous; the delay is a function of all intermediate equipment and media along the data path. Because different routes may be taken along each data path, there may exist a difference in latency and the delay experienced by each if each party is connected with a separate data path. Unfortunately, this difference in latency among multiple simultaneous data paths poses a significant security risk for a prison. As a result, the visitor or inmate may engage in an improper communication during the visit, but the difference in latency between connections prevents the overseer from learning of the improper conduct in time to prevent it or further improper conduct from occurring. Accordingly, what is needed is a video visitation system for permitting video visits between participants that is not endpoint controlled and that does not suffer from the deficiencies found in the prior art.

BRIEF SUMMARY

Disclosed herein are methods of scheduling and conducting monitored or non-monitored video visits, as well as computer architecture for providing such scheduling and conducting of video visits, where the participants in the video visit are not required or able to interact with the audio/video equipment for the initial connection to start the video visit. In addition, in some embodiments participants are also not able to interact with the equipment during the actual visit. Whether they can interact with the equipment during the visit or not (e.g., voice-actuated volume control, etc.), the audio/video equipment employed during the video visit may be isolated from physical contact by the first participant or second participant, and therefore may be located at fixed or mobile geographic locations where such equipment connections and operations may be maintained.

In one embodiment of a method of scheduling such a video visit, the method includes assigning an individual ID code to a first participant and second participant in the video visit, for example, a caller and a receiver in a video visit. Of course, any number of participants may participate in the visit. In this example, to schedule a visit between these two participants, the first participant contacts a data center and enters the ID code of the second participant he is trying to visit with. In a more specific embodiment, the second participant is a prison inmate and the first participant is a family member of the inmate desiring a visit with the inmate using audio/video communications equipment, however, any types of participants may be present. When the ID code for the second participant is entered, the data center may then conduct a check to determine whether second participant is permitted to receive video visits. Also, the first participant's ID code may also be submitted to the data center and checked to determine if the first participant is permitted to be in contact with the second participant.

In another embodiment, devices may be employed to verify the identity of the first participant, such as biometric devices. Such biometric technologies are defined as automated devices/methods for identifying or authenticating the identity of a living person based on a physiological or behavioral characteristic. For example, fingerprint reading devices, retina scanning devices, voice identification devices, face mapping devices, signature comparison devices and the like may be employed to further ensure security during the video visit by authenticating the identity of the first participant. Moreover, if the participants are being charged for making the video visit, the data center may also determine if sufficient funds (or credit) for the visit have been paid. One advantage to the disclosed video visits is that the first participant may visit with the second participant over long distances that may otherwise prevent their communication. As such, in one embodiment, the data center may prompt the participant making the reservation for his geographic location(s), and then present several locations near the first participant's location for conducting the visit. Once a suitable location is selected, the visit may be scheduled and then conducted at the appropriate time. In addition, other participants may also be given the option to select desirable geographic locations for them to participate in the video visit.

In one embodiment of a method of conducting a video visit, the method includes connecting the first participant and second participant at the scheduled time using the data center and without any action taken by the first participant or second participant, or anyone associated with their geographic locations, to initiate the visit. Once the video visit begins, in some embodiments, certain rules for the visit may be displayed for the participants to read. For example, if the visit is between a prison inmate and one or more of his family members, the rules may discuss how the visit is being monitored by appropriate personnel and that perhaps "secret" communications between the parties (e.g., hand signals, facial gestures, movements, etc.) are not permitted during the visit. In such an embodiment, the method also includes an overseer actively monitoring the visit between the parties.

In a related embodiment, the overseer may be simultaneously monitoring multiple such video visits, and may have the ability to select the audio communications of any particular visit for closer monitoring and inspection, as well as zoom in on one of the particular video feeds should the need arise. Examples of other potential violations may be hand-signs, gestures, or even expressly saying certain words or phrases. If the overseer determines a rules violation has or is occurring, he may intervene with a warning to one or both of the parties. Continued rules violations may lead to termination of the visit, or the overseer, or perhaps automated equipment, may determine that the violation is of the sort that requires the visit to be terminated immediately. In addition, a notation of the incident(s) may be made in the video visit records associated with either or both of the first participant and second participant, which may in turn affect the permission required for the two to conduct another visit in the future. Conversely, if the visit is concluded without incident, the appropriate records may also be updated as such.

In another aspect, a system for conducting a video visit is also disclosed. In one embodiment, the system includes a data center configured to initiate and terminate an audio/video communication between first and second participants. The system also includes a first terminal coupled to the data center for use by the first participant to visit with the second participant, and a second terminal coupled to the data center for use by the second participant to visit with the first participant. In a specific embodiment, the data center is coupled to the first and second terminals via a computer network, for example, a packet-based network such as the Internet. Each of the first and second terminals may also be coupled to the computer network via their own local area network.

In a broad aspect, the system also includes a multiplexing means, which may be embodied in hardware, software, of a combination of both, that is configured to receive communication data, encrypted or unencrypted, sent between the first and second participants during the audio/video communication, and to generate copied data based on the communication data. In addition, such a system would include an overseer coupled to the multiplexing means and configured to receive the copied data and to monitor the audio/video communication between the first and second participants using the received copied data. In an exemplary embodiment, the multiplexing means is geographically proximate to the first terminal and configured to provide the communication data to the first terminal and the copied data to the overseer. In an alternative embodiment, the multiplexing means may be geographically proximate to the data center and configured to provide the communication data to the first and second terminals and the copied data to the overseer. In yet other embodiments, recording equipment configured to receive the copied data for data storage and retrieval is also included in the system, perhaps via the same or a second multiplexing means.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION OF PREFERRED EMBODIMENTS

Figure 1:
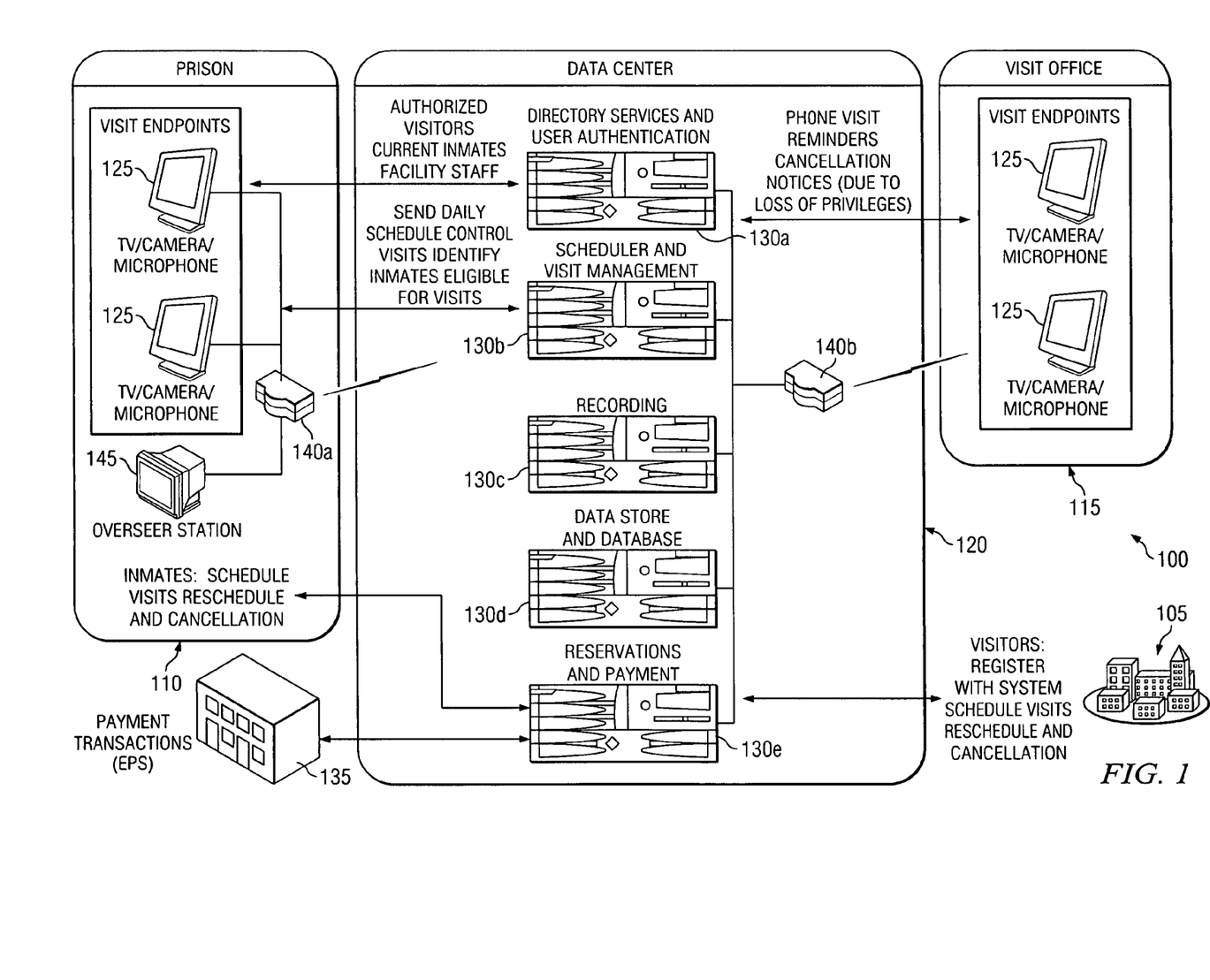
FIG. 1 illustrates a conceptual view of one embodiment of a system for providing monitored video visits in accordance with the principles disclosed herein.

Referring initially to FIG. 1, illustrated is a conceptual view of one embodiment of a system 100 for providing monitored or unmonitored video visits in accordance with the principles disclosed herein. The system 100 includes a group of first participants 105, which in the illustrated embodiment is a group of visitors 105 seeking to have a video visit with inmates in a prison 110. While many embodiments described herein are discussed in terms of prison inmates and visitors of those inmates, nothing herein should be interpreted to limit the disclosed systems and methods to only the prison visitation scenario. Instead, the disclosed systems and methods are easily employable in any situation where two or more participants wish to conduct a video visit. For example, the disclosed systems and methods may be implanted not only for video prison visits, but also for such uses as real-time video visits among government officials or business personnel, for medical diagnostics and possibly assisting in performing procedures from afar (e.g., "tele-medicine"), business video meetings, and even for educational purposes, such as transmitting a live session to a group of students connected to the same local network. In short, the disclosed principles are useful in any situation where two or more parties wish to communicate using video and audio equipment.

The system 100 also includes a visit office 115 where a visitor may go to conduct his side of the video visit. Linked between the visit office 115 and the prison 110 is a data center 120, which provides the connection between the visit office 115 and the prison 110. In non-prison scenarios, the prison 110 may be another location where a second participant may go to conduct his side of the video visit, for example, another visit office. In the illustrated embodiment, both the visit office 115 and the prison 110 contain visit terminals 125 for participating in a video visit conducted as disclosed herein. Specifically, the terminals 125 may each include a video display (e.g., TV, computer/video screen, computer terminal, etc.), and video camera for capturing the image of the participant, and a microphone for capturing audio from the participant at that location. In a more specific embodiment, these different components are housed in a single structure comprising the terminal 125. Of course, in other embodiments, these devices may be structurally separated from each other.

Whether located in a single device or not, it should be especially noted that the terminals 125 do not include any type of interactive input device accessible by the participant at that location. As a result, the participants at these visit endpoints are not responsible, or even capable, of initiating the video visit. Instead, the video visit is initiated at a scheduled time by the data center, as discussed in further detail below. This elimination of endpoint interactive control makes the disclosed system especially useful in scenarios where the participants are ill-equipped to operate devices for initiating a video visit, or where the participants are not trusted to operate such devices, either for the safety of the equipment or the security of the location of the participant. As such, the system 100 is especially useful in prison situations where inmate operation of video visit equipment is discouraged, either because they are ignorant of such equipment or for the protection of the equipment itself from damage or theft. Moreover, with scheduled video visits that are initiated by a central data center, there can be no argument about lost visit times caused by, for example, delays in connecting or problems with equipment operation.

Looking again at FIG. 1, the data center 120 houses the equipment 130 used to schedule and conduct the video visits. More specifically, the data center 120 includes Directory Services and User Authentication equipment 130a. This equipment 130a provides identification and authentication services for the participants in the video visit, such as through stored lists of available participants and identification (ID) codes associated with them. In addition, this equipment 130a can be configured to provide reminder calls to participants to remind them of an upcoming scheduled video visit, as well as to inform participants of changes in the availability of other scheduled participants, such as the revocation of visitation privileges of a prison inmate.

The data center 120 also includes Scheduler and Visit Management equipment 130b, which coordinates the scheduling of video visits between participants. In addition, this equipment 130b also provides participant (e.g., inmate) identification, determines eligibility for video visits of certain participants, generating and sending lists of scheduled visits (e.g., daily schedules for the visit centers established in a prison), and controls the initiation and terminal of the visit. The data center 120 also includes Recording equipment (130c), which is configured to record video visits for later use. Also, the data center 120 includes data storage equipment 130d for storing recordings of video visits, as well as any other useful information or lists for use in scheduling or conducting video visits. The data center 120 still further includes Reservations and Payment equipment 130e for performing accounting duties for video visits, such as interactive scheduling by participants, receiving payments, providing payment and account information or status to other system 100 components, as well as participants in the visits. For example, both visitors 105 and inmates in a prison scenario may interact with this equipment 130e to schedule their video visit, make payments, and receive cancellation notices and information for rescheduling the cancelled visit. In fact, in all embodiments disclosed herein, scheduling, paying for, canceling or receiving notice of a cancellation, rescheduling, etc. may be done by any of the participants of a video visit.

Also illustrated in FIG. 1 is external equipment 135 also configured to work with the Reservations and Payment equipment 130e. The external equipment 135 may be any type of equipment that assists participants with services or transactions related to the system 100, such as a particular method for making payment for a video visit. For example, the external equipment 135 may be accessed by potential participants of a visit for making payment via any available method, such as an electronic payment service (EPS). In such an embodiment, the participant would provide payment to a vendor (potentially the company's equipment) with the EPS equipment 135 and the EPS equipment 135 would transfer information to the Reservations and Payment equipment 130e indicating the payment had been made and by and/or for whom. Of course, the external equipment 135 is not necessary for the operation of a system 100 like the one illustrated in FIG. 1. It should also be noted that the term "equipment" as used above to discuss parts of the data center 120 is not limited to simply hardware, but may also include software capable of providing the described functions.

When conducting the video visits, the data center 120 initiates, typically at a scheduled time, two high-speed data connections. In this embodiment, one connection is with a terminal 125 in the visit office 115 and the other connection is with a terminal in the prison 110. This allows communication to occur between a participant at a terminal 125 in the visit office 115 and a participant at a terminal 125 in the prison 110 via the data center 120. In an advantageous embodiment, the high-speed connections are provided using conventionally available high-speed data connections, such as a TI connection. Of course, other types of data connections are also possible. To greatly reduce, and in most cases eliminate, difference in latency in transmissions/streams used in conventional video conferencing, multiplexing means 140a, b are provided at strategic points proximate to endpoints of the communication path where two or more connections are needed or desired. For example, in the prison scenario an overseer may be assigned to monitor the video visit of an inmate participant for security purposes.

Now, it should be noted that the reduction or elimination of latency in transmissions discussed herein is not an elimination of latency in the transmission provided by a single data stream. Instead, this refers to a reduction or elimination of the difference in latency that typically exists between two or more parallel data streams. In traditional video conferencing systems, the visitor, the inmate, and the overseer would connect into a Multi-point Control Unit (MCU) such that three distinct data connections are made with a central location. Unfortunately, for any number of reasons, such as the distance of each participant from the central location, differences in equipment among the participants, potential connection or transmission problems with one of more of the connections, latency between any two or more connections usually occurs. Thus, the time involved in transmitting from one endpoint to another endpoint may be exactly the same as with conventional video conferencing, but the difference in latency that exists between multiple streams in video conferencing is reduced or eliminated since only a single stream is present across the network 205.

In contrast, in accordance with the disclosed principles, the multiplexing means 140a, b receives a single, unicast connection from the data center, and then generates a copied data signal based on the communication data (e.g., communications data representing the video and audio signals, and which may be encrypted or unencrypted) in the unicast connection. As a result, the multiplexing means 140a associated with the prison 110 in this example will generate two identical data streams during the video visit with a terminal 125 at the visit office 120, with one stream going to a terminal 125 in the prison (where the inmate can use it for the visit) and the other stream going to the overseer's terminal 145. Thus, virtually no significant latencies exist between the signals, and therefore between what the inmate sees, hears, or does, and what the overseer receives on his terminal. Some inconsequential latencies that could occur would simply be caused, for example, by differences in lengths of cables/connections of the overseer's terminal versus the inmate's terminal, and other inconsequential delays. Such latencies are rarely more than a few milliseconds, which is typically far too short a time for a security violation to occur. Thus, the overseer 145 can monitor the inmate (and the visitor) during the video visit in real-time, keeping a watchful eye for any security problems.

In addition to providing multiplexing functions at specific locations (e.g., by splitting communications signals to participants and overseers), a multiplexing means 140b may also be provided at the data center 120. This multiplexing means 140b is similar in design and operation as the multiplexing means 140a used to control or eliminate latencies between participants and overseers, and may be employed to split communications signals of the video visit among the various functions and equipment in the data center 120. For example, the multiplexing means 140b can be employed, as illustrated, to split the communications signals associated with the video visit between the Scheduler & Visit Management equipment 130b and the Recording equipment 130c. In this example, no significant latency exists between these split signals when the communications signals are split using the multiplexing means 140b. In all embodiments, the disclosed multiplexing means 140a, b may be embodied in hardware, software, of a combination of both, and no limitation to any particular structure or design is intended or should be implied. The use of such multiplexing means are discussed in greater detail below.

Figure 2:
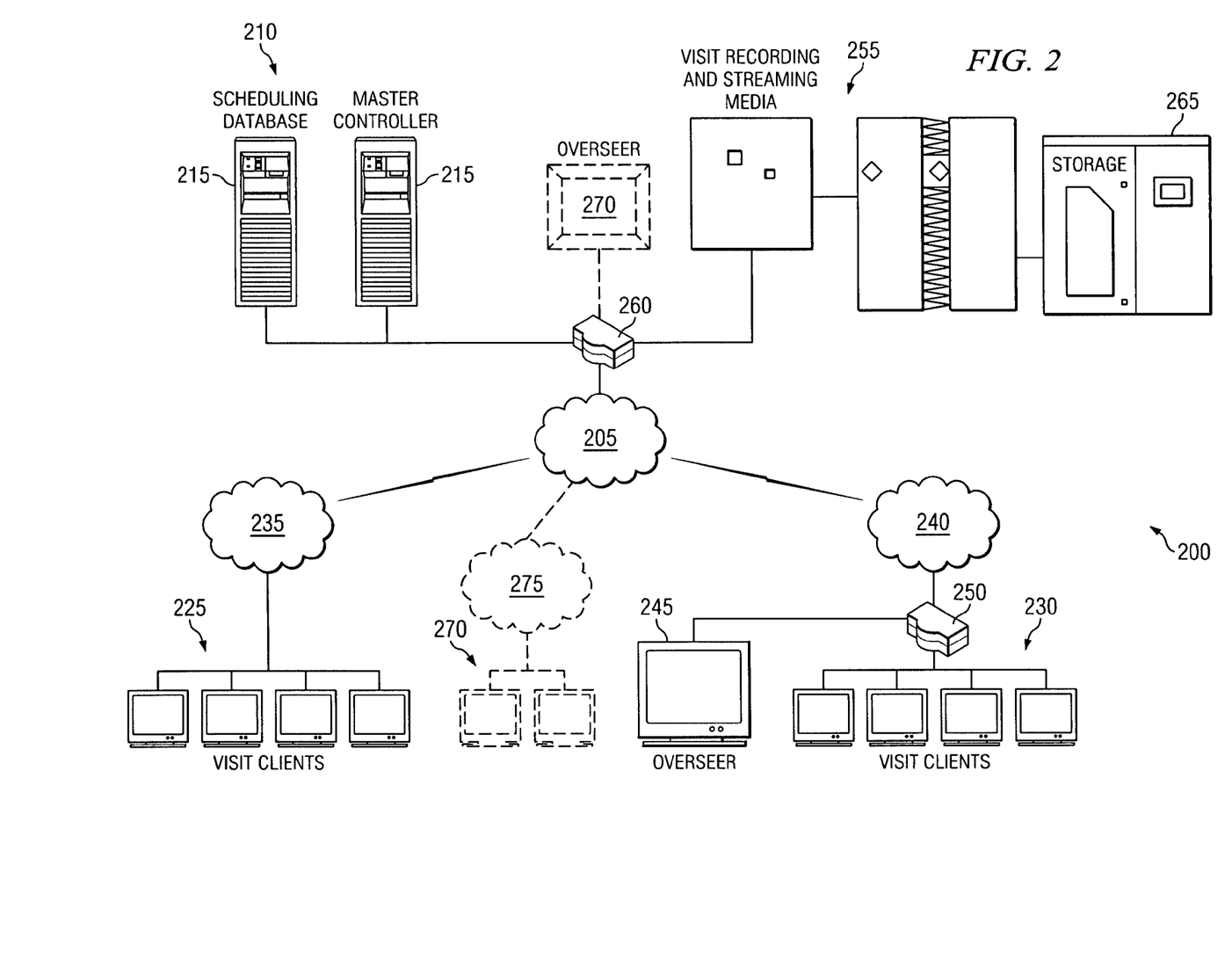
FIG. 2 illustrates one embodiment of the architecture for a computer network for providing the monitored video visits discussed above.

Turning now to FIG. 2, illustrated is one embodiment of the architecture for a video visit system 200 for providing the monitored video visits discussed above. The system 200 illustrated in FIG. 2 is constructed around a large computer network 205. The computer network 205 may be a packet-based network, such as the Internet, capable of transmitting communications signals used in conducting the video visits via data packets.

The system 200 also includes components similar to several of those described in the conceptual layout of FIG. 1, including a data center 210 having a Scheduling Database 215 and a Master Controller 220 for conducting and controlling a video visit between first and second participants 225, 230 in their respective video visits. In this embodiment, there are illustrated four first participants 225 each having a separate video visit with a corresponding one of the second participants 230. Of course, these four first participants 225 may alternatively be participating in a single video visit with one or more of the second participants 230. Any type or speed of connection may be employed with the disclosed principles in order to accommodate the number of video visits or number of participants in any one video visit. Examples include T1, T3, T4, DSL, SHDSL, DS3, OC3, a satellite link, and other types of wired or wireless high-speed data communications links.

Also as illustrated, in this embodiment the first participants 225 are connected to the computer network 205 via a private network, such as a Local Area Network (LAN) 235. Similarly, the second participants 230 are connected to the computer network 205 via their own private LAN 240. Both of the LANs 235, 240 may be conventional computer networks that link related personnel and equipment, such as the computer network of a business or in modern prisons. In other embodiments, the LAN (e.g., 235) may be specifically created for hosting participants in video visits, such as the visit office 115 discussed above with respect to FIG. 1.

The system 200 also includes an overseer monitor stations/terminal 245 associated with the second participants 230. In such embodiments, the second participants 230 may be inmates in a prison, as discussed above, and the overseer(s) 245 may be monitoring each of the inmates' video visits for security purposes. In an exemplary embodiment, a single overseer may be tasked with monitoring multiple video visits at one time. For example, the overseer's terminal 245 may be capable of displaying multiple sets of participants at one time. In such embodiments, the overseer may be able select any one of the video visits to focus on and listen to the dialog taking place. In fact, the principles disclosed herein for conducting such video visits would permit the overseer job to be out-sourced, for example, overseas. So long as the overseers receive communications data of the video visit(s) copied from a single connection between the participants, monitoring behavior could be just as effective as a local overseer. In other embodiments, it may be better to employ local overseers familiar with, for example, a prison inmate, since that overseer may be very familiar with the habits and conduct of the particular inmate participating in the video visit.

As discussed in detail above, a system 200 for providing video visits in accordance with the disclosed principles has the distinct advantage over conventional video conferencing of no significant latencies between the communications signals transmitted and received by the terminals of the inmates 230 and those transmitted and received by the overseer 245. As before, the elimination of significant signal latencies is provided by a multiplexing means 250. As illustrated, the multiplexing means 250 couples the second participants 230 and the overseer 245 to that location's LAN 240; however, the multiplexing means 250 may also simply provide a direct connection to the computer network 205 without the use of a LAN.

In some embodiments, the multiplexing means 250 is a physical device, similar in function to a router, but is configured to copy or split the signal rather than redirect it. In other embodiments, however, the multiplexing means 250 may be entirely software-based, such as a software daemon. In such embodiments, multiplexing means 250 could be a piece of code that runs on a networking server, or a cluster of servers. For example, the code embodying the multiplexing means 250 may be running on servers that are located in the local LAN.

The system 200 further includes Recording equipment 255, which may be configured to receive a copied/split data stream with the communications data of a video visit, via another multiplexing means 260. More specifically, since a video visit is only initiated and terminated by the master controller 220 in the data center 210 and cannot be initiated or terminated by any of the endpoints of the system 200 (e.g., client terminals, overseer terminals, recording equipment, etc.), the communications data flows back and forth between the first and second participants via the data center 210. As a result, the other multiplexing means 260 may be interposed in the transmission path of the data center 210 to copy or split the data signal. Thus, the Recording equipment 255 receives the same communications data as the data center 210, with no significant latencies between those data streams.

The recorded data may then be stored in a data storage unit 265 associated with the Recording equipment 255. Depending on the data formats employed, transmission times and storage size can be controlled. In embodiments, where copies of the recorded video visits will often be desired by one of more of the participants, the recorded communications data may be converted to a commonly playable format and stored in the data storage unit 265 in that format. As such, the recordings may be quickly accessible and copied to transportable media (e.g., VCD, DVD, etc.) for purchase by the participant. However, in embodiments where copies of recordings are not likely to be sought very often, the data may be stored in the data storage unit 265 in a raw format that is less computationally expensive to create/store, therefore decreasing equipment costs. Then, if a copy is desired, the raw data may be converted to the desired format for playback.

In an advantageous embodiment, the transmission of communications data from one terminal to another is accomplished by employing the well-known Real-time Transmission Protocol (RTP). Within such RTP transmissions, any number of video and audio encoding technologies may be employed based, for example, on available bandwidth, desired video and audio quality, and the like. Based on current experience, the transmission of the communications data of the video visits across the computer network 205 (e.g., the Internet) is the most expensive part of the visit from a bandwidth standpoint. This is because the transmissions in RTP format during the actual visits are streaming data. Moreover, the streaming data is also typically the slowest and least reliable, which means that these streams will induce the most latency in the transmission.

In contrast, however, bandwidth on LANs is, for all intents and purposes, free, and is typically faster and more reliable because it is a privately operated and maintained network. Thus, because streaming data across the public computer network 205 is the most problematic (and likely the most expensive) part of conducting the video visit, the communications data is split by the multiplexing means 250 locally, rather than creating multiple data streams (one for each participant's, overseer's, and recording equipment's use) across the network 205, as is done with traditional video conferencing. As a result, since there is only a single data stream across the network 205 for each video visit, the latency problem between multiple streams is a non-issue.

In addition, since the data stream for the visit is being split locally by a multiplexing means 250, 260, the geographic location of the overseer may be distal from that of the inmates 230, without the concern of security breaches to occur during latency periods between two or more data streams. This is illustrated by overseer 270 being located proximate to the recording equipment rather than at the prison. Alternatively, the overseer may be located with the visitor of an inmate, rather than with the inmate. Similarly, the recording equipment may also have a different geographic location than the data center 210, so long as it can receive a split signal from one of the multiplexing means. Moreover, because the data stream between the terminals associated with the first and second participants still flows through the data center 210, security is maintained.

Still further, it should be noted that the disclosed principles are by no means limited to only two participants, a visitor and the visited. In contrast, video visits conducted in accordance with the disclosed principles can support any number of participants, for example, multiple first participants 225 visiting with a single second participant 230, a single first participant 225 visiting with multiple second participants 230, or even one or more third participants 270 communicating with both the first and second participants 225, 230 through their own separate LAN 275. In addition, an overseer, recording equipment, etc. may be located proximate to any one of these locations.

Figure 3A:
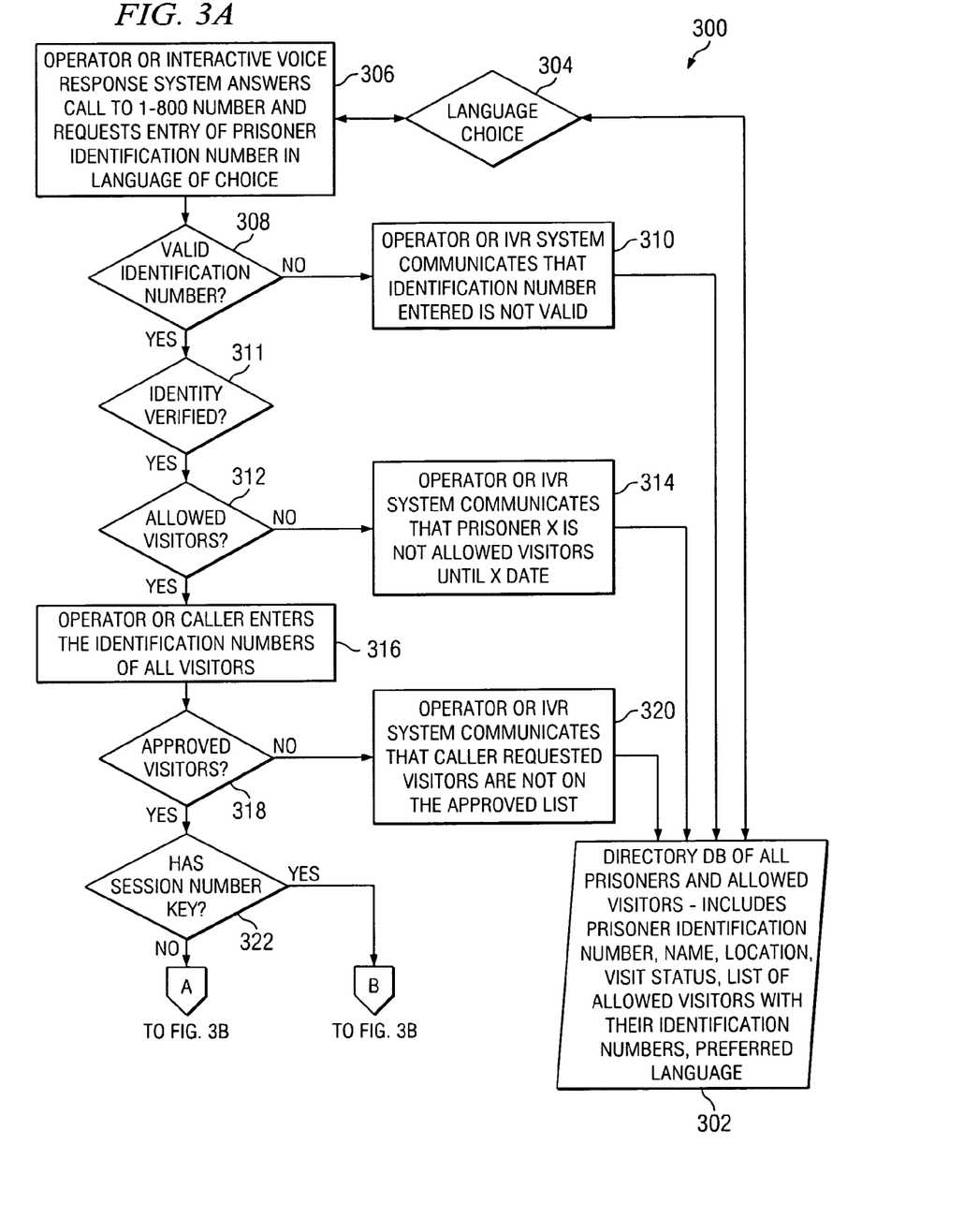
FIGS. 3A & 3B illustrate a flow diagram that sets forth one embodiment of a process for scheduling a video visit between a visitor and a prison inmate.
Figure 3B:
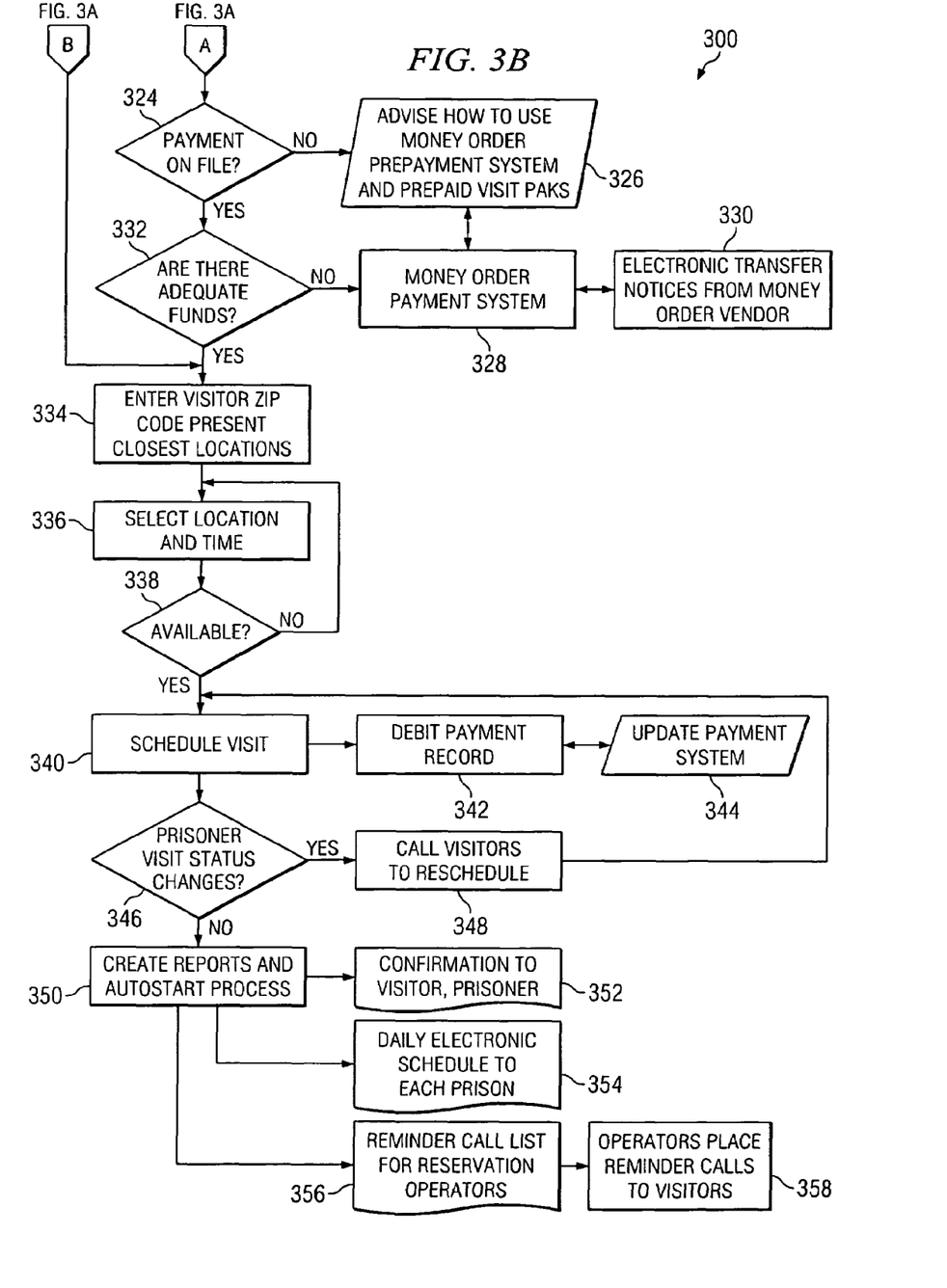

Looking now at FIGS. 3A & 3B, illustrated is a flow diagram 300 that sets forth one embodiment of a process for scheduling a video visit between a visitor and a prison inmate. FIG. 3A includes a database (DB) 302 of all inmates and allowed visitors for those inmates. Each of these parties is a participant in the video visit, and as mentioned above each has an identification code assigned to them. The DB 302 includes the lists of participants, as well as their corresponding ID codes, names, and other personal information, as well as specialized information associated with each participant, such as their status on the being able to participate in video visits, the preferred language for conducting a video visit, and the like.

To schedule a video visit, one of the participants, for example, either an inmate or a visitor in the prison scenario, contacts the scheduler, such as the scheduler discussed with reference to FIG. 1. As an initial matter, the process may allow the participant to select their language of choice at block 304. Next, the participant scheduling the video visit may be connected with a live operator or perhaps an automated voice response system, as shown at block 306. For example, an Interactive Voice Response System (IVR System) may be employed to solicit entries by the participant to schedule the visit. In alternative embodiments, a live human operator may be employed, which may be preferred in embodiments where the individuals using the scheduling process are ill-equipped to operate an IVR system. In embodiments where the participants do not handle that kind of automation very well, fewer mistakes in the scheduling process may be made if human operators are involved.

Also at block 306, the scheduler enters his ID number or code, and then enters the ID code for the inmate (or other participant) he wishes to visit. At block 308, the ID codes entered are validated, while at block 310, the operator or IVR system can communicate to the scheduler that an entered ID code is invalid when the situation arises. At block 311, the process may optionally validate the identity of the scheduler. For example, biometric devices, such as finger print reading devices, retina scanning devices, voice identification devices and the like may be employed to verify that the scheduler actually is the person to whom the ID code for scheduling visits has been assigned. Such verification data may also be stored in internal databases for future reference. The system may then inform the scheduler if a proper match is not found, and terminate the scheduling process. If at block 308 it is determined that valid ID codes have been entered, it is then determined at block 312 whether the inmate with which a video visit is desired is allowed to participate in a video visit. If it is determined that the inmate is not allowed to participate in a video visit at the time, that information may be given to the scheduler, as well as the earliest date when the inmate is permitted a visit.

At block 316, once the identity of all potential visitors is verified, their ID codes are entered into the system. Then, at block 318, it is determined whether the inmate is allowed a visit by all the potential visitors entered into the system. For example, in the prison scenario, an inmate may not be allowed visits by certain people, such as any of his known criminal cohorts. If such an unapproved visitor is identified, the scheduler is informed of that information at block 320, and that a visit may not be scheduled at this time for that reason. If all potential visitors are approved to visit the inmate, it is next determined at block 322 whether the scheduler has a "session key." More specifically, when a prior video visit session had been terminated, not for cause but for technical reasons or some other problems, a session key may be issued to that visitor so that that person can come in and not have to pay for another visit. If a session key is not present, the process moves on to block 324 where it is determined whether the scheduler has paid the appropriate fee for the visit.

At block 326, if no payment is found to be on file, the scheduler may be informed of the various options for making payment. In one example, a money order payment system may be employed at block 328 to make the proper payment for the visit, which results in an electronic transfer notice from a money order vendor at block 330. If it is determined at block 324 that a payment is on file, it may next be determined whether enough funds exist in the payment file for the scheduled video visit. If the funds on file are inadequate, the scheduler may be directed towards the money order system, again at block 328, where sufficient payment may be made. Of course, any type of payment system may be employed when scheduling a video visit in accordance with the disclosed principles, such as credit cards, wire transfers, prison cafeteria account, cash, checks, etc., and no limitation to any particular method of payment is intended.

Once it is determined that adequate funds have been paid, the process moves to block 334 where the scheduler is asked to enter his ZIP code. Alternatively, if a session key had been detected back at block 322, the scheduler would have jumped ahead to block 334, since no further payment would be required. Based on the ZIP code of the scheduler, he is then presented with a list of the geographic locations, either close to his location or not. The visitor/scheduler may then come to a video visit location and use one of a number of available video stations to conduct the visit. Thus, at block 336 in FIG. 3B, the scheduler selects the geographic location he would like to use, and is allowed to select an available time for the visit. At block 338, it is determined whether the time entered by the scheduler is available, either based on the availability of the inmate, or perhaps the availability of the video visit location or station terminal.

After a time and location for the video visit have been approved, the visit is scheduled in the system at block 340. In addition, a debit for payment of the scheduled visit is made at block 342, and the payment system is accordingly updated at block 344. Assuming no changes in status of any of the scheduled participants occurs, the visit will occur at the scheduled time. However, in the case of a prison, the ability of an inmate to receive visitors may change. Thus, at block 346, if such a status change for the inmate occurs, the visitor is contacted at block 348 so that the visit may be rescheduled. If no future visits will be allowed, the visitor may then simply be given a refund of any payment. Such checks into the status of an inmate may be conducted on a regular basis, e.g., daily, since the status of any participant can change at any time. In other embodiments, although blocks 346 and 348 refer to a change in status of an inmate and the rescheduling by a visitor, the disclosed methods and systems are not so limited. Thus, in the prison scenario an inmate may be notified of a need to reschedule based on the change in status of the visitor, while in a nonprison scenario, any participant may become unavailable and any participant may reschedule a visit or be notified of a rescheduling by another participant. However, if no change in status has occurred, current status reports and schedules may be generated at block 350, and a confirmation may be sent to the visitor and/or inmate, as shown in block 352. In addition, in the prison scenario, several video visits with different inmates may be scheduled on any given day. As such, a daily schedule of scheduled visits may be distributed to the prisons, as shown in block 354.

As the date for the scheduled video visit approaches, a list of the visits scheduled for the next couple of days may be generated at block 356. This list may then be used to place reminder calls to the scheduler of these approaching visits. Thus, the process may provide a courtesy call to the scheduler at block 358 to remind him of the upcoming visit. Finally, looking back at block 350, an "Autostart" process for the scheduled video visit is updated with the appropriate information for conducting the visit. As discussed above, the Autostart process is the automated process employed to actually initiate the video visit at the scheduled time, without human intervention by any of the participants.

Figure 4:
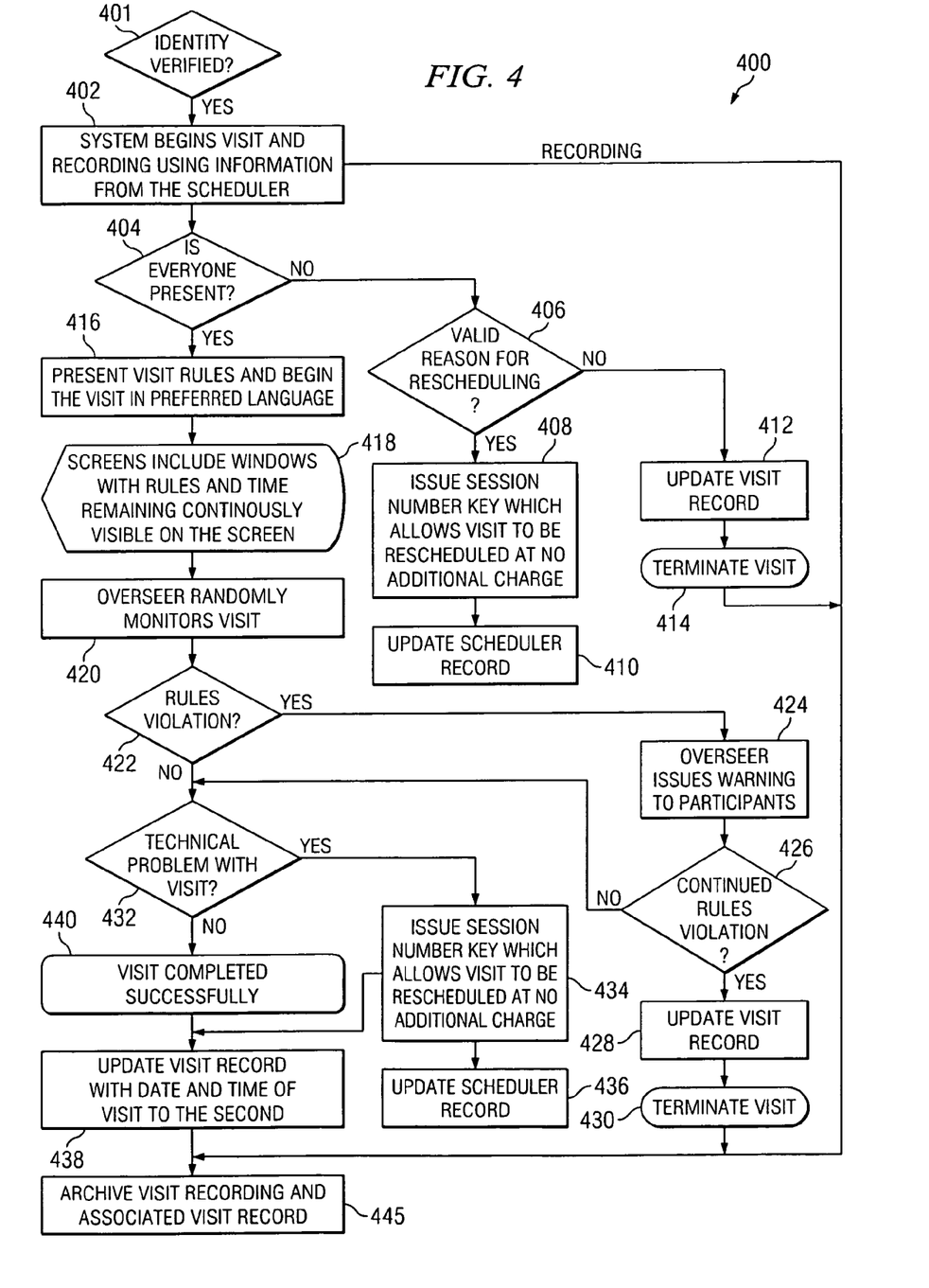
FIG. 4 illustrates a flow diagram that sets forth one embodiment of a process for conducting a video visit between a visitor and a prison inmate, such as the visit scheduled with reference to FIGS. 3A & 3B.

Referring now to FIG. 4, illustrated is a flow diagram 400 that sets forth one embodiment of a process for conducting a video visit between a visitor and a prison inmate, such as the visit scheduled with reference to FIGS. 3A & 3B. Based on the locations, schedule, time, terminal, etc. scheduled by the visitor, all of the participants know or are informed of where exactly they should be at the scheduled visit time. In addition, an overseer, if employed to monitor the video visit, is also informed of the scheduled visit time and of the participants, and any limitations associated with the participants. For example, the overseer will be informed of certain hand signals, gestures, or perhaps direct language that may be used between the visitor and the inmate to inappropriately communicate during the video visit.

At block 401, before the video visit between all the participants begins, the identity of one or all of the participants may be verified. As before, biometric devices, such as finger print reading devices, retina scanning devices, voice identification devices and the like, may be employed to verify such identities. Also as before, such verification data may also be stored in internal databases for future reference. The system may then detect if a proper match is not found, and terminate the scheduled video visit before it even begins. Once any necessary identities have been verified, at block 402 the system begins the video visit at the scheduled time, and the visit may be recorded for future use.

At block 404, it is determined if everyone scheduled to participate in the visit is present. If everyone scheduled is not present, it is determined if a valid reason for rescheduling is present, at block 406. A valid reason for not making the scheduled visit may be, for example, that the visitor had a car accident prior to the scheduled visit and therefore cannot make the scheduled time. Another reason may be illness or perhaps the death of a loved one. If a valid reason is present, a session key may be issued to the visitor at block 408, which allows the visit to be rescheduled at no additional charge. Once the visitor has rescheduled the visit, the appropriate records may be updated with the new information at block 410. If no valid reason has been determined at block 406, the appropriate visit records are updated at block 412, and the present visit is terminated at block 414.

Back at block 404, if it was determined that all proper participants are in fact present at the scheduled time and in their respective appropriate locations, the visit process moves on to block 416 where required rules for the video visit are then displayed to all of the participants, typically in the selected preferred language of the participants. More specifically, the rules inform the participants that if they misbehave during the visit, the visit may be terminated and no refund is given. In addition, the rules may inform the participants that inappropriate behavior may be reported to the appropriate authorities, which may result in sanctions beyond the loss of a video visit. Furthermore, the participants may also be informed that the video visit is being recorded, and that they could be prosecuted for any misbehavior that happens as a part of this visit. In some embodiments of the visit process, the visit rules and remaining time for the visit are constantly displayed to the participants on their respective video terminals, as shown at block 418, so that there can be no mistake as to such items during the visit.

Accordingly, the video visit is conducted among the participants, during which time, at block 420, an overseer randomly monitors the visit, and possibly other visits occurring at the same time. In addition, the overseer may specifically direct his attention to any one video visit occurring in order to more closely monitor the goings on in a particular visit. At block 422, it is determined whether any violations are occurring in a particular video visit. If a rules violation is observed, the overseer may interrupt the video visit at block 424. At block 426, it is determined whether a rules violation(s) is persisting. If violations are continuing, the visit record for the participants is updated, at block 428, and the visit may be terminated at block 430. Once terminated, the recording of the video visit and any associated visit records are archived at block 445. If rules violations do not continue, the visit is permitted to continue in the typical fashion.

While the video visit is occurring, technical check-ups may be periodically conducted to ensure the visit continues without unnecessary interruption. At block 432, if a technical problem is detected, a session key may be issued to the visitor, at block 434, which allows the visit to be rescheduled at no additional charge. In addition, at block 436, the appropriate record in the scheduling equipment may be updated. However, if no technical problems occur, and no rules violations result in the termination of the visit, the process moves to block 440, which illustrates that the video visit has been successfully completed. Then, the appropriate visit records are updated at block 438 with, for example, the date and time of the visit, which may be recorded accurately to the second. Then, once the video visit has finished, the recording of the video visit and any associated visit records are archived at block 445. The archived visit recording and records may then be available by appropriate personnel in the future. For example, copies of the recording of the video visit may be sold to the participants or other authorized persons as a commemorative remembrance of the visit. In other embodiments, the recordings and/or records may be subpoenaed or otherwise acquired by authorities for evidential purposes, if needed.

Figure 5:
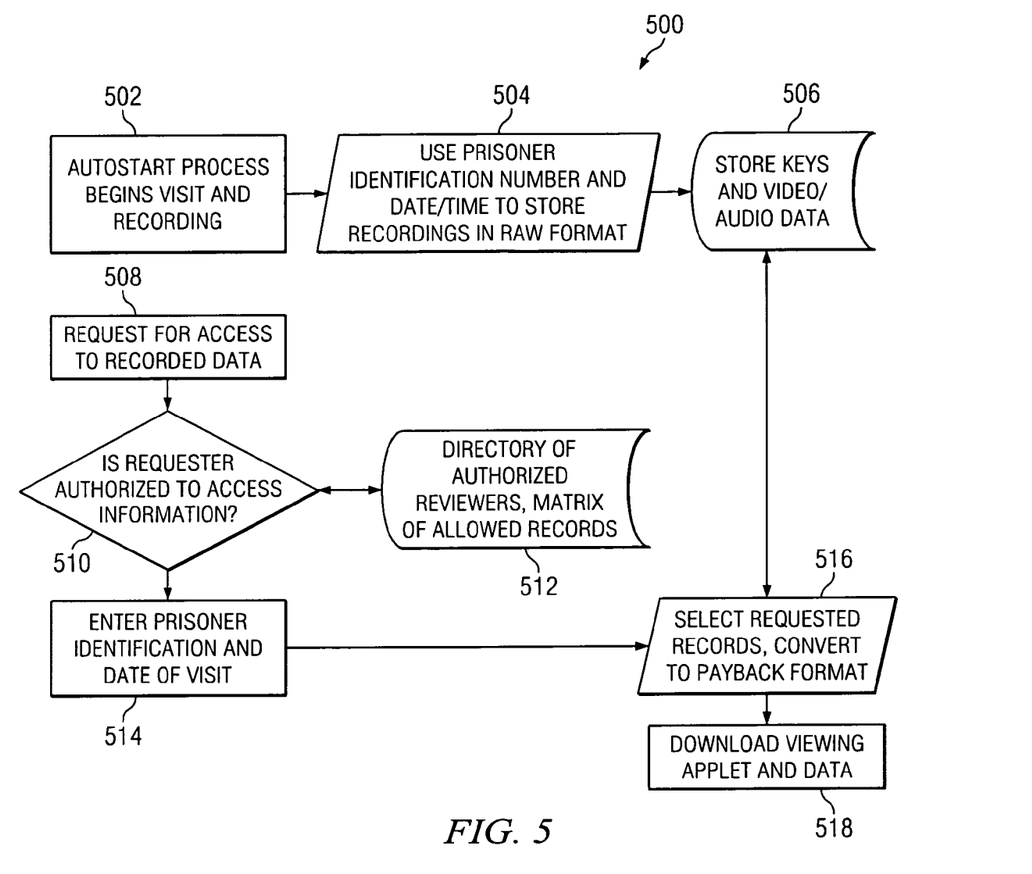
FIG. 5 illustrates a flow diagram that sets forth one embodiment of a process for recording and playing back a video visit conducted according to the disclosed principles.

Turning finally to FIG. 5, illustrated is a flow diagram 500 that sets forth one embodiment of a process for recording and playing back a video visit conducted according to the disclosed principles. At block 502, the autostart process begins the video visit and the recording of the visit, in the manner discussed above with reference to FIG. 4. At the conclusion of the video visit, the recording and any associated records are stored for future use. In one embodiment, a computer database is used to store the recordings in digital format, as discussed above. Of course, any type of storage devices may be used, including the storing of analog recordings made on conventional video cassette tapes.

In some embodiments using digital media storage for the recordings, the visits are stored in their raw data format, for example, in H.263 video and G.711 audio formats. In such embodiments, the data may be compressed and quickly stored without employing time and resources to convert the data to a typical playable format. In other embodiments, the data may be converted before storage to a playable format, such as the popular MPEG, MPEG2, MPEG4, .mov, or .avi formats. No matter what format the recordings are stored in, whether now known or later developed, the files may be identified for storage and retrieval using corresponding keys, which may be based on participant ID codes, date/time, or other identifying information, at block 504. At block 506, the storage keys and recordings (data) are stored.

When a requested stored recording of a prior video visit is desired or otherwise sought, a request for access to a copy of the recording is first received at a block 508. As mentioned above, copies of the recordings may be requested by participants themselves, friends of the participants, or perhaps family members of a participant as a commemorative remembrance of the visit. In other embodiments, copies of the recordings may also be requested via court order, such as with a subpoena if needed for a judicial proceeding. When a request is received, it is determined whether the requester is authorized to access the information at block 510. For example, in the prison scenario the requestor may be the warden of the prison housing the inmate, where the warden is authorized (in most situations) to view the recordings in the interest of prison security. However, in other embodiments, the video visit may have been between an inmate and his attorney. In such embodiments, the warden may not be authorized to view the recording of the video visit because of attorney-client privilege issues. Thus, in order to determine if a requester is authorized to access the recording, a directory of authorized persons and accessible records may be queried, as shown in block 512.

In addition to selectively allowing access to only certain requesters, the identity of the requestor may also be verified, as in the manner discussed above with reference to FIGS. 3A and 3B. Once the requestor has been authorized to view recordings, the requestor may then enter, at block 514, the ID code of the inmate and the date the video visit occurred. In some embodiments, if the exact date of a recording is not known, or if the past visits of a particular inmate are simply be reviewed for security purposes, a range of dates for all visits that occurred within that time period may be entered by the requestor. The stored recordings are then searched and the appropriate files retrieved at block 516. Also at block 516, if the recording was stored in its raw format it may then be converted to an appropriate playback format, such as those exemplary formats set forth above.

In other embodiments, the recording may simply be converted from one format to a different format that is desired by the requestor. For example, if the recording of the visit was stored in MPEG format but the requestor would like it in .avi format, such format conversion may be provided as a service for the requestor. In yet other embodiments, copies of the recordings may be provided on common playable formats, such as on a DVD disc, for the convenience of the requestor. Of course, in most if not all embodiments, obtaining a copy of the recording would be at a cost to the requestor. At block 518, the data comprising the recording may then be provided to the requestor, for example, via a download across a computer network for viewing on the requestor's computer terminal. Alternatively, the recording may be provided on portable media, such a disc, as mentioned above.

While various embodiments of scheduling and conducting monitored video visits according to the principles disclosed herein, as well as the architecture for providing such scheduling and conducting of video visits, have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of monitoring a video visit between at least a first participant and a second participant located at distinct endpoints, the method comprising:
    establishing a first data connection from a data center and the first participant at a scheduled time;
    establishing a second data connection from the data center and the second participant at the scheduled time, the first and second participants visiting via the first and second data connections;
    capturing video and audio as original communications data from the first and second participants;
    transmitting the original communications data to and from the first and second participants across a computer network via the data center;
    splitting along the first or second data connection either the communications data transmitted from one of the first and second participants to the data center, or the communications data transmitted to the one of the first and second participants from the data center, to create a copy of the video and audio communications data from the original video and audio communications data; and
    monitoring the video visit by receiving the copy of the communications data at a monitoring station substantially simultaneously with the transmitting of the original communications data to and from the one of the first and second participants.

2. A method according to claim 1, wherein the splitting comprises splitting the original communications data with a multiplexing means.

3. A method according to claim 2, wherein the first and second participants are positioned at respective first and second geographic locations, and the data center is positioned at a third geographic location.

4. A method according to claim 3, wherein the multiplexing means is positioned at the first, second, or third geographic location.

5. A method according to claim 4, wherein the monitoring further comprises monitoring at the location of the multiplexing means.

6. A method according to claim 1, further comprising recording the communications data by receiving the copied communications data with recording equipment.

7. A method according to claim 6, wherein the splitting comprises splitting the communications data with a multiplexing means.

8. A method according to claim 7, wherein the recording equipment is positioned at the location of the multiplexing means.

9. A method according to claim 8, wherein the recording equipment is located with the data center.

10. A method according to claim 1, wherein the scheduled time is determined based on an availability of the first or second participant.

11. A method according to claim 1, wherein the second participant is a prison inmate and the first participant is visitor of the prison inmate.

12. A method according to claim 1, wherein the monitoring further comprises monitoring a plurality of video visits at the same time.

13. A method according to claim 12, further comprising selecting audio from one of the plurality of video visits during the monitoring.

14. A method according to claim 1, wherein the computer network is a packet-based computer network.

15. A method according to claim 14, wherein the packet-based computer network is the Internet.

16. A method according to claim 1, wherein the first and second data connections comprise wired or wireless high-speed data communications links.

17. A method according to claim 16, wherein the high-speed data communications links are selected from the group consisting of a T1 line, a T3 line, a T4 line, DSL, SHDSL, DS3, OC3, and a satellite communications link.

18. A method according to claim 1, further comprising determining whether the second participant is authorized to communicate with the first participant before establishing the first and second data connections.

19. A method according to claim 1, further comprising verifying the identity of the first or second participant before establishing the first and second data connections.

20. A method according to claim 19, further comprising verifying the identity of the first or second participant using a biometric device.

21. A method according to claim 20, wherein the biometric device is selected from the group consisting of a finger print reader, a retina scan reader, a face mapping device, a voice recognition device, and a signature comparison device.

22. A method according to claim 1, further comprising determining if sufficient monetary funds have been paid for the video visit before establishing the first and second data connections.

23. A method according to claim 22, wherein the funds have been paid by the first participant or second participant.

24. A method according to claim 22, wherein the funds have been paid using at least one selected from the group consisting of wire transfers, electronic fund transfers, currency, bank draft, and money order.

25. A method according to claim 1, further comprising displaying rules for participating in the video visit to the first and second participants during the video visit.

26. A method according to claim 25, wherein the rules pertain to prohibited conduct during the video visit.

27. A method according to claim 26, wherein the monitoring further comprises terminating the video visit based on a rules violation.

28. A method according to claim 27, further comprising noting the termination on a status of the second participant, the noting affecting availability of the second participant to engage in a future video visit.

29. A method according to claim 1, wherein transmitting further comprises transmitted encrypted communications data.

30. A system for monitoring a video visit between at least a first participant and a second participant located at distinct endpoints, the system comprising:
a data center connected to a computer network;
a first terminal associated with the first participant and configured to capture video and audio as original communications data from the first participant during the video visit;
a second terminal associated with the second participant and configured to capture video and audio as further original communications data from the second participant during the video visit;
a first data connection between the data center and the first terminal established by the data center at a scheduled time;
a second data connection between the data center and the second terminal established by the data center at the scheduled time;
transmitting means configured to transmit all of the original communications data to and from the first and second participants across the computer network and via the data center;
multiplexing means along the first or second data connection configured to split either the original communications data transmitted from one of the first or second participants to the data center, or the original communications data transmitted to the one of the first or second participants from the data center, to create a copy of the video and audio communications data from the original video and audio communications data; and
a third terminal connected to the multiplexing means and configured to receive the copy of the communications data substantially simultaneously with the transmitting of all of the original communications data to and from the one of the first and second participants for use in monitoring the video visit.

31. A system according to claim 30, wherein the first and second participants are positioned at respective first and second geographic locations, and the data center is positioned at a third geographic location.

32. A system according to claim 31, wherein the first terminal is connected to the data center via a first local area network, and the second terminal is connected to the data center via a second local area network.

33. A system according to claim 32, wherein the multiplexing means is positioned at the first, second, or third geographic location.

34. A system according to claim 33, wherein the third terminal is positioned proximate to the location of the multiplexing means.

35. A system according to claim 30, further comprising recording equipment configured to receive and record the copied communications data.

36. A system according to claim 35, further comprising another multiplexing means for copying the communications data transmitted to the recording equipment.

37. A system according to claim 36, wherein the recording equipment is positioned at the location of the multiplexing means.

38. A system according to claim 37, wherein the recording equipment is located with the data center.

39. A system according to claim 30, wherein the scheduled time is determined based on an availability of the first or second participant.

40. A system according to claim 30, wherein the second participant is a prison inmate and the first participant is visitor of the prison inmate.

41. A system according to claim 30, wherein the third terminal is configured to receive communications data comprising a plurality of video visits at the same time.

42. A system according to claim 41, wherein the third terminal is further configured to selectively provide audio from only one of the plurality of video visits during monitoring.

43. A system according to claim 30, wherein the computer network is a packet-based computer network.

44. A system according to claim 43, wherein the packet-based computer network is the Internet.

45. A system according to claim 30, wherein the first and second data connections comprise wired or wireless high-speed data communications links.

46. A system according to claim 45, wherein the high-speed data communications links are selected from the group consisting of a T1 line, a T3 line, a T4 line, DSL, SHDSL, DS3, OC3, and a satellite communications link.

47. A system according to claim 30, wherein the data center further comprises managing equipment configured to determine whether the second participant is authorized to communicate with the first participant before the first and second data connections are established.

48. A system according to claim 30, wherein the data center further comprises authentication equipment configured to verify the identity of the first or second participant before the first and second data connections are established.

49. A system according to claim 48, wherein the authentication equipment comprises a biometric device.

50. A system according to claim 49, wherein the biometric device is selected from the group consisting of a finger print reader, a retina scan reader, a face mapping device, a voice recognition device, and a signature comparison device.

51. A system according to claim 30, wherein the data center further comprises payment equipment configured to determine if sufficient monetary funds have been paid for the video visit before establishing the first and second data connections.

52. A system according to claim 51, wherein the funds have been paid by the first participant or the second participant.

53. A system according to claim 51, wherein the funds have been paid using at least one selected from the group consisting of wire transfers, electronic fund transfers, currency, bank draft, and money order.

54. A system according to claim 30, wherein the multiplexing means is embodied in hardware, software, or a combination of both.

55. A system according to claim 30, wherein the communications data is encrypted communications data.

* * * * *